United States Patent
Pless et al.

(10) Patent No.: US 12,510,247 B2
(45) Date of Patent: Dec. 30, 2025

(54) FUEL INJECTOR COMBUSTION SEAL ASSEMBLY

(71) Applicant: Siemens Mobility, Inc., New York, NY (US)

(72) Inventors: Travis Pless, Melbourne, FL (US); Carlos Paz Portilla, Westlake, FL (US); Parimal Bhosle, Roseville, CA (US)

(73) Assignee: Siemens Mobility, Inc., New York, NY (US)

( * ) Notice: Subject to any disclaimer, the term of this patent is extended or adjusted under 35 U.S.C. 154(b) by 0 days.

(21) Appl. No.: 18/430,718

(22) Filed: Feb. 2, 2024

(65) Prior Publication Data
US 2025/0251132 A1   Aug. 7, 2025

(51) Int. Cl.
*F23R 3/28* (2006.01)
*F16J 15/06* (2006.01)

(52) U.S. Cl.
CPC ............ *F23R 3/283* (2013.01); *F16J 15/061* (2013.01); *F23R 2900/00012* (2013.01)

(58) Field of Classification Search
CPC ....... F02M 2200/853; F02M 2200/858; F02M 55/004; F16J 15/061; F16J 15/064; F16J 15/065; F16J 15/08; F23R 3/283; F23R 2900/00012
See application file for complete search history.

(56) References Cited

U.S. PATENT DOCUMENTS

| | | | |
|---|---|---|---|
| 4,589,596 A * | 5/1986 | Stumpp | F02M 61/14 239/397.5 |
| 9,080,540 B2 | 7/2015 | Peters et al. | |
| 9,410,520 B2 * | 8/2016 | Franks | F02M 61/14 |
| 10,036,355 B2 * | 7/2018 | Franks | F02M 53/043 |
| 10,605,213 B2 * | 3/2020 | Peters | F02M 55/004 |
| 10,746,145 B1 * | 8/2020 | Rondeau | F02M 61/14 |
| 2009/0235898 A1 * | 9/2009 | Short | F02M 53/046 123/470 |
| 2010/0024776 A1 * | 2/2010 | Frick | F02M 51/0603 123/478 |
| 2017/0051713 A1 * | 2/2017 | Peters | F02M 61/14 |

* cited by examiner

*Primary Examiner* — Nicholas L Foster (57) ABSTRACT

A combustion seal assembly includes a seal member with a first section and a second section, and a heat shield member, wherein the seal member and the heat shield member are configured to form a combustion seal, and wherein the first section or the second section of the seal member incorporates a holding device to retain the seal member in place with the heat shield member.

5 Claims, 11 Drawing Sheets

View C-C

FUEL INJECTOR COMBUSTION SEAL ASSEMBLY

TECHNICAL FIELD

Aspects of the present disclosure generally relate to a fuel injector combustion seal, and more specifically a fuel injector combustion seal assembly for internal combustion engines, for example for locomotives.

BACKGROUND ART

Locomotives with internal combustion engines, also known as internal combustion locomotives, produce its pulling power utilizing fuels such as diesel or gasoline. Internal combustion engines typically each include an engine body and fuel injectors mounted in respective injector mounting bores, including nozzle assemblies for injecting fuel into engine cylinders for combustion. An internal combustion engine with a fuel injector may require a combustion seal, for example to keep combustion gases in a combustion chamber of the internal combustion engine from flowing into a passage surrounding the fuel injector and to protect the fuel injector from excessive heat by removing heat via the combustion seal.

SUMMARY

Briefly described, aspects of the present disclosure relate to a fuel injector combustion seal assembly, more specifically a fuel injector seal assembly for internal combustion engines, for example for internal combustion locomotives.

More specifically, an aspect of the present disclosure provides a combustion seal assembly comprising a seal member comprising a first section and a second section, and a heat shield member, wherein the seal member and the heat shield member are configured to form a combustion seal, and wherein the first section or the second section of the seal member incorporates a holding device to retain the seal member in place with the heat shield member.

DETAILED DESCRIPTION

To facilitate an understanding of embodiments, principles, and features of the present disclosure, they are explained hereinafter with reference to implementation in illustrative embodiments. They are described in the context of a fuel injector combustion seal assembly comprising a seal member and a heat shield member, utilized in connection with a fuel injector and an internal combustion engine.

The components and materials described hereinafter as making up the various embodiments are intended to be illustrative and not restrictive. Many suitable components and materials that would perform the same or a similar function as the materials described herein are intended to be embraced within the scope of embodiments of the present disclosure. Like reference symbols in the various drawings indicate like elements.

Figure 1:
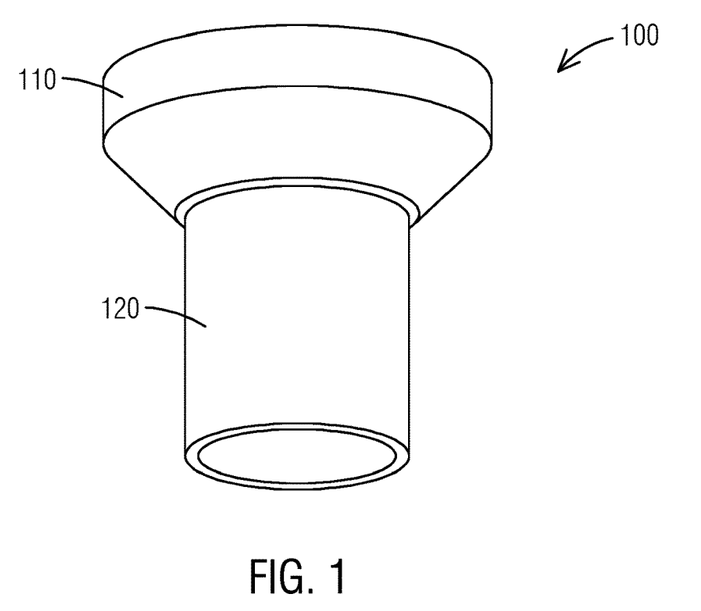
FIG. 1 and FIG. 2 illustrate perspective views of an example fuel injector combustion seal assembly including seal member and heat shield member in accordance with embodiments disclosed herein.
Figure 2:
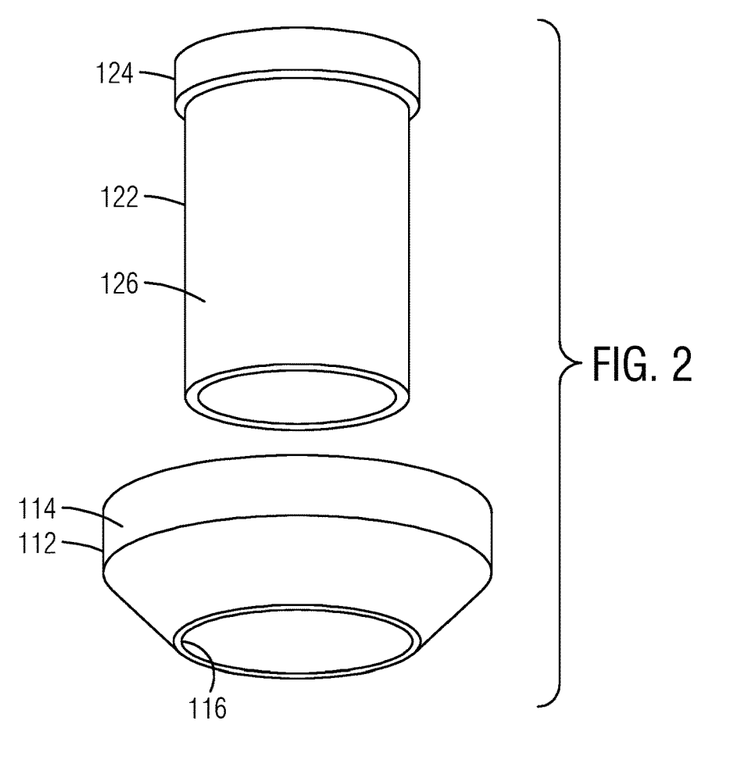

FIG. 1 and FIG. 2 illustrate perspective views of an example fuel injector combustion seal assembly in accordance with embodiments disclosed herein.

The fuel injector combustion seal assembly 100, herein also referred to as the seal assembly 100, comprises a seal member 110 formed of a first material, and a heat shield member 120 formed of a second material that is different from the first material, for positioning in a fuel injector mounting bore formed in a portion, e. g, cylinder head, of an engine body of an internal combustion engine (not shown).

Injector seal assembly 100 provides a metal-to-metal combustion seal with contact pressures high enough to yield seal member 110 into sealing contact against interior surface of injector mounting bore, and then maintain that contact pressure with the force from the fuel injector mounting or securement system (not shown).

While seal member 110 and heat shield member 120 are formed as distinct or separate components, they are connected to each other to form the seal assembly 100. In an alternative embodiment, seal member 110 and heat shield member 120 may be manufactured as a single unitary component.

The seal member 110 is sized, dimensioned, and formed of an appropriate material such that seal member 110 retains its structural integrity under load from the fuel injector mounting or securement system. The seal member 110 is generally circular in shape and comprises a tapered body 112 including a first section 114 and a second section 116. In an example, the seal member 110 is formed of a single unitary piece. In an exemplary embodiment, the seal member 110 is formed of a stainless-steel material. It should be noted that the seal member may comprise or may be formed of other materials.

The heat shield member 120 is sized, dimensioned, and formed of an appropriate material to withstand when forced into an interference fit with another component, such as nozzle element housing or seal member 110. Heat shield member 120 is a component that is fabricated distinctly or formed separately from seal member 110 of a material that is different from the material of seal member 110. The purpose of the two different materials is to beneficially combine a material having sufficient a structural or load bearing strength to receive the significant loads required to secure fuel injector in cylinder head with an enhanced thermal conductivity to transport, transfer, or wick heat from a distal end of nozzle element housing toward an upper portion of fuel injector that is cooler than the distal end of nozzle element housing.

The heat shield member 120 comprises a cylindrical body 122. The cylindrical body comprises an upper section 124 and a lower section 126, the upper section 124 comprising an outer diameter that is greater than an outer diameter of the lower section 126. In an example, the heat shield member 120 is formed of a single unitary piece and is configured as thermally conductive component. In the exemplary embodiment, the heat shield member is formed of a copper material. It should be noted that other materials having suitable thermal conductivity and suitable yield strength may also be used.

As noted, seal member 110 and heat shield member 120 may be manufactured as a single unitary component. In an example, such a one-piece component may be manufactured or formed from a copper material.

Figure 3:
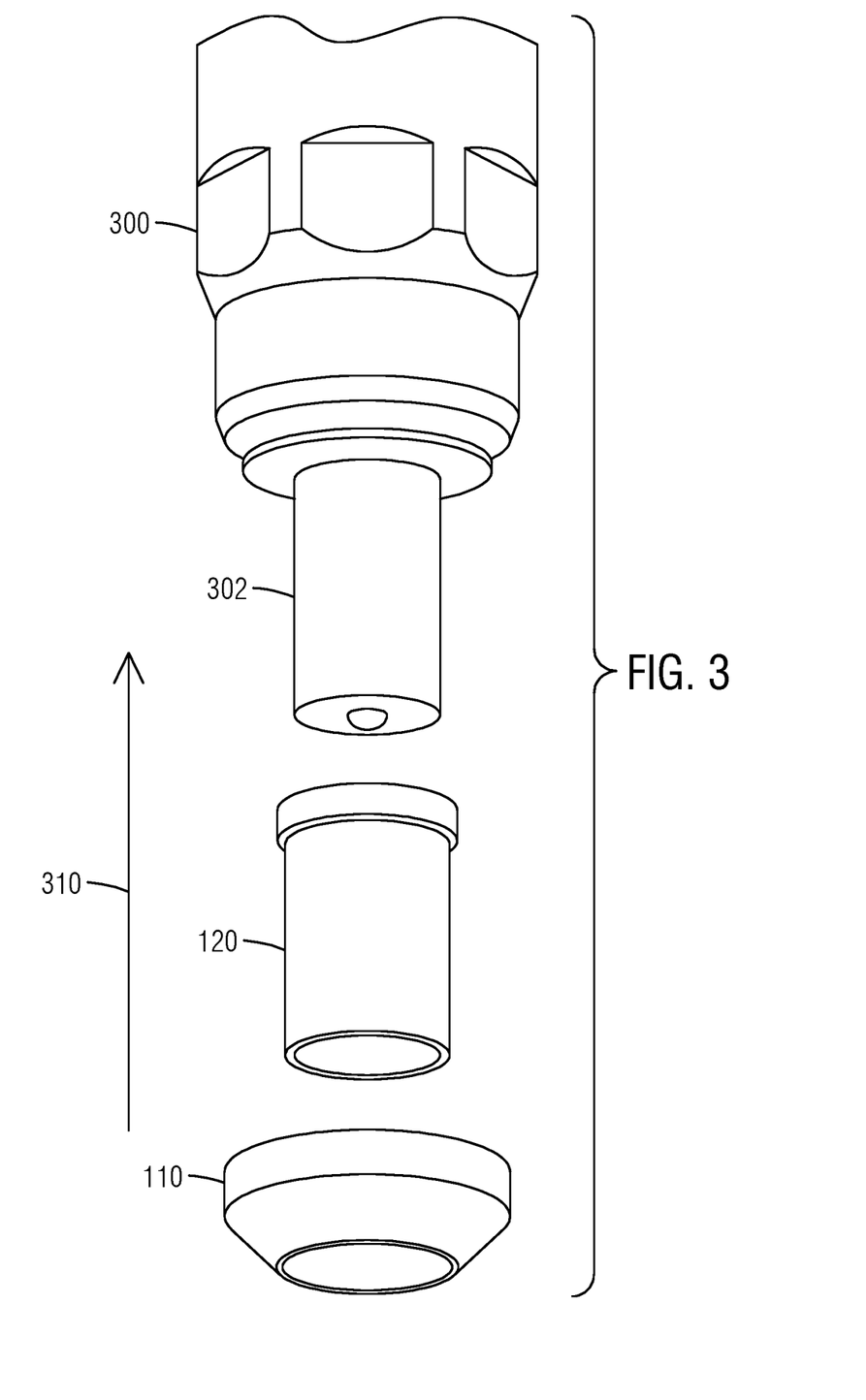
FIG. 3 illustrates perspective views of an example fuel injector combustion seal assembly in connection with a fuel injector in accordance with embodiments disclosed herein.

FIG. 3 illustrates a perspective view of an example fuel injector combustion seal assembly in connection with a fuel injector in accordance with embodiments disclosed herein.

As noted, internal combustion engines typically each include an engine body and fuel injectors mounted in respective injector mounting bores, including nozzle assemblies for injecting fuel into engine cylinders for combustion. Fuel injector 300 is part of an internal combustion engine (not shown). The fuel injector 300 comprises a combustion seal assembly 100, including seal member 110 and heat shield member 120, as described herein.

The assembly and install of the seal assembly 100, indicated by arrow 310, comprises first installing the heat shield member 120 at the injector nozzle 302, and then sliding the seal member 110 over the heat shield member 120, thereby forming a transition fit (push fit).

In exemplary embodiments of the present disclosure, the seal member 110 alone, or the seal member 110 in combination with the heat shield member 120, incorporate(s) a holding device to retain the seal member 110 in place with the heat shield member 120. Different embodiments of the seal assembly 100 and the holding device are described in the following with respect to FIGS. 4 to 10.

Figure 4:
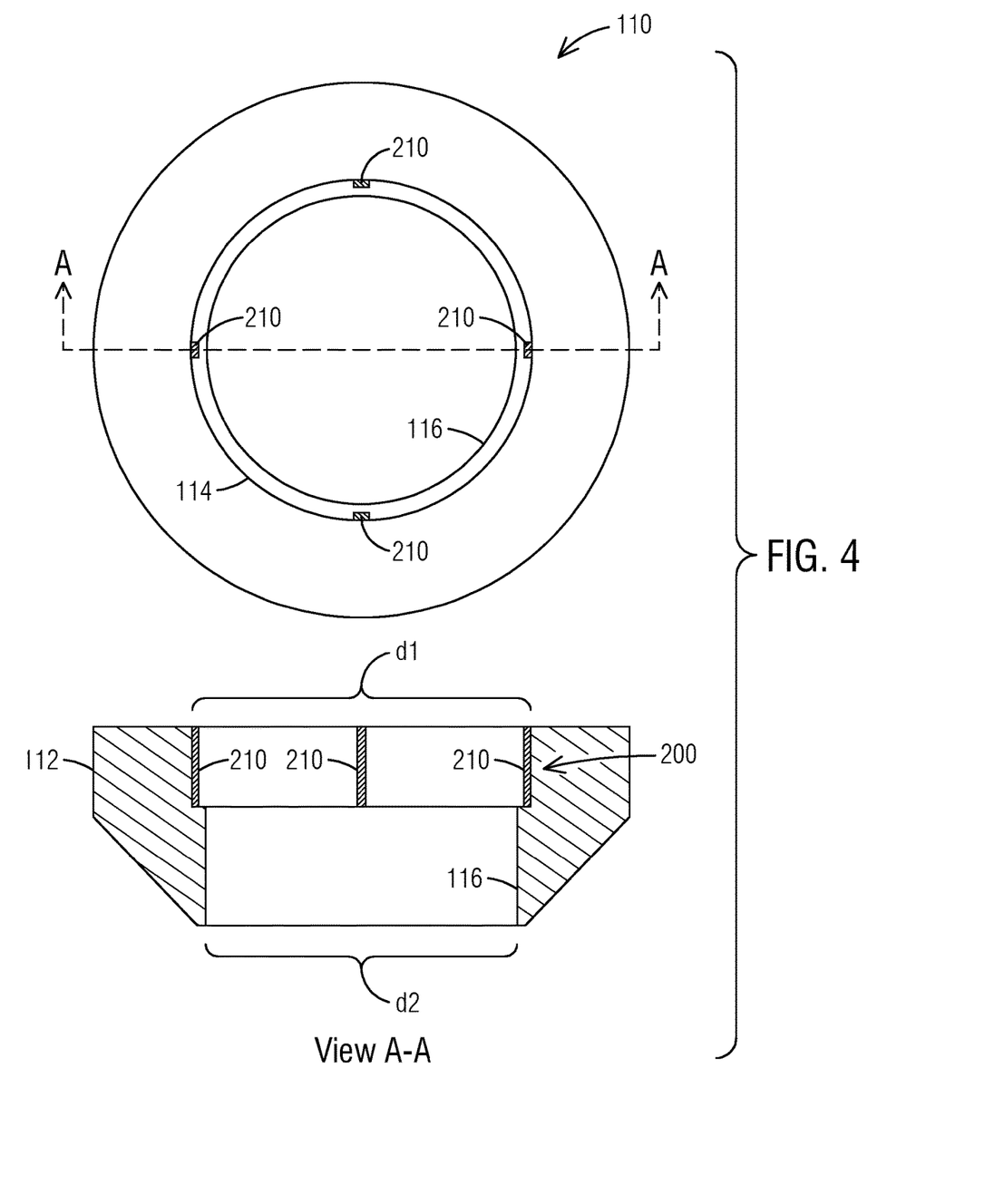
FIG. 4 illustrates a top view and cross-sectional view of a seal member in accordance with a first exemplary embodiment of the present disclosure.

FIG. 4 illustrates a top view and a cross-sectional view of a seal member 110 of the seal assembly 100 in accordance with a first exemplary embodiment of the present disclosure.

In exemplary embodiments, the seal member 110 incorporates or comprises a holding device, generally labeled with reference numeral 200, to retain the seal member 110 in place with the heat shield member 120. The holding device 200 as described herein includes means to hold or keep the two components 110, 120 in place so that they properly form the seal assembly 100 and thus properly form a combustion seal. Without the holding device 200, the seal member 110 may slip off the heat shield member 120. For example, the holding device 200 retains the seal member 110 in place while conducting injector service or maintenance of the fuel injector. The seal member 110 "incorporates" a holding device means that the seal member 110 is machined or manufactured such that the holding device 200 is included or integrated or part of the seal member 110, and the holding device 200 is not a separate component or element. The seal member 110 comprises a tapered cylindrical body 112 including the first section 114 and the second section 116. The first section 114 comprises a first inner diameter d1 that is greater than a second inner diameter d2 of the second section 116.

In accordance with an exemplary embodiment of the present disclosure, the first section 114 of the seal member 110 comprises the holding device 200. The holding device 200 comprises a plurality of friction fit elements arranged equidistantly on an inner surface of the first section 114. More specifically, the plurality of friction fit elements is configured as friction fit fingers 210 arranged longitudinally from an upper end to a lower end on the inner surface of the first section 114. The example of FIG. 4 illustrates four (4) friction fit fingers 210. However, it should be noted that the seal member 110 may comprise more or less than 4 friction fit fingers 210, for example six (6) friction fit fingers as shown in and FIG. 5 and FIG. 6. When installing the heat shield member 120 and the seal member 110 (see FIG. 3), the first section 114 with the friction fit fingers 210 forms a friction fit, also known as transition fit or push fit, with the upper section 124 of the heat shield member 120. Size and dimensions of the friction fit fingers 210 may vary but are such that the seal member 110 and heat shield member 120 properly form the seal assembly 100.

Figure 5:
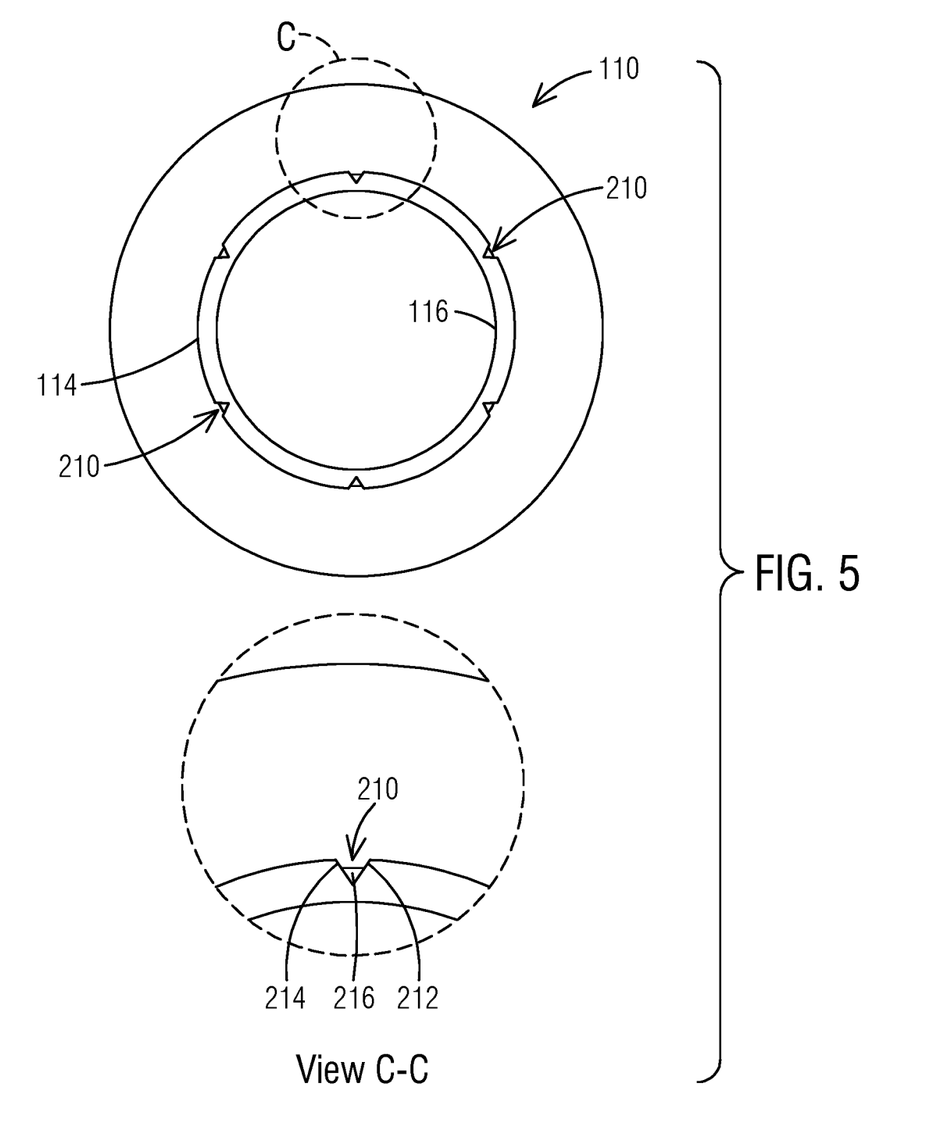
FIG. 5 and FIG. 6 illustrate a top view and s cross-sectional view of a seal member in accordance with a second exemplary embodiment of the present disclosure.
Figure 6:
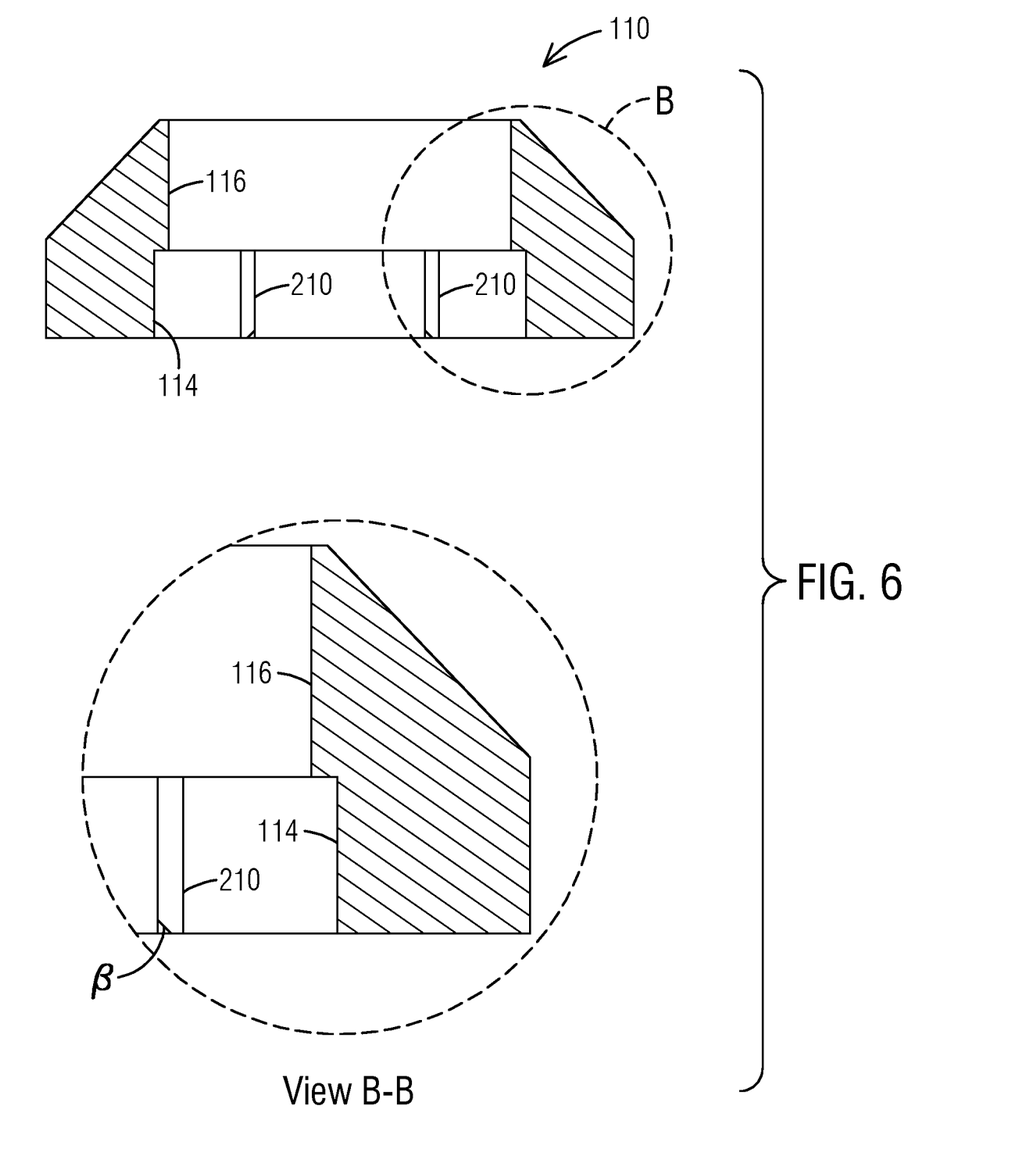

FIG. 5 and FIG. 6 illustrate top views and cross-sectional views of a seal member 110 of the seal assembly 100 in accordance with a second exemplary embodiment of the present disclosure.

As noted above, the seal member 110 may comprise a holding device 200 including more than four friction fit fingers 210. In accordance with an exemplary embodiment of the present disclosure and with reference to FIG. 5 and FIG. 6, the seal member 110 incorporates six (6) friction fit fingers 210. The friction fit fingers 210 are arranged and distributed equidistantly on an inner surface of the first section 114. More specifically, the friction fit fingers 210 are arranged longitudinally from an upper end to a lower end on the inner surface of the first section 114, see FIG. 6.

FIG. 5, DETAIL C, provides an example of form and dimension of a friction fit finger 210. The friction fit finger 210 may be pointed. The friction fit finger 210 may have a form that can be considered a triangle. The triangle may have identical sides 212, 214 that protrude into a center bore of the seal member 110. An angle α between the two sides 212, 214 can be for example 60°±3°, but other angles are possible. Further, it should be noted that other forms and dimensions of the friction fit finger 210 are possible. For example, the friction fit finger 210 may have a form that looks like a triangle with a rounded top/edge or a sharp top/edge 216 as shown in DETAIL C. In other examples, the friction fit finger 210 may be rectangular or semicircle in shape. In yet other examples, the friction fit finger 210 may be arranged longitudinally from an upper end to a lower end on the inner surface of the first section 114 in a continuous manner as shown in FIG. 6, or the friction fit finger 210 may be arranged in a non-continuous manner, i. e. interrupted or with gaps, form the upper end to the lower end of the first section 114. Further, FIG. 6, DETAIL B, illustrates that the friction fit finger 210 can be slanted at one side/end, for example slanted at the side/end toward facing an outside of the seal member 110. The friction fit finger 210 may be slanted at an angle β which can be for example 45°, but other angles β are possible, or the friction fit finger 210 may not be slanted at all.

Figure 7:
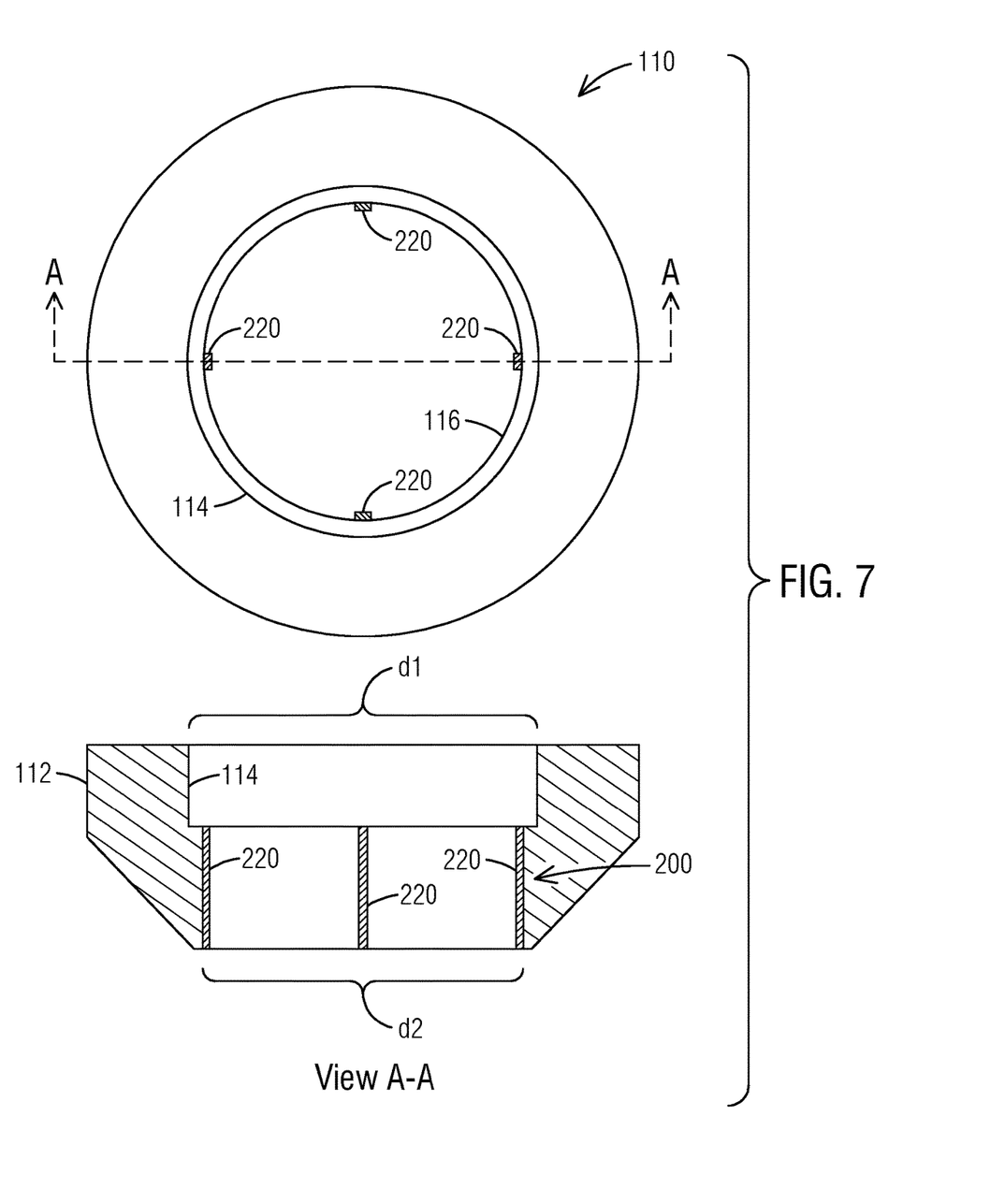
FIG. 7, FIG. 8 and FIG. 9 illustrate top views and cross-sectional views of a seal member in accordance with a third, fourth and fifth exemplary embodiment of the present disclosure.
Figure 8:
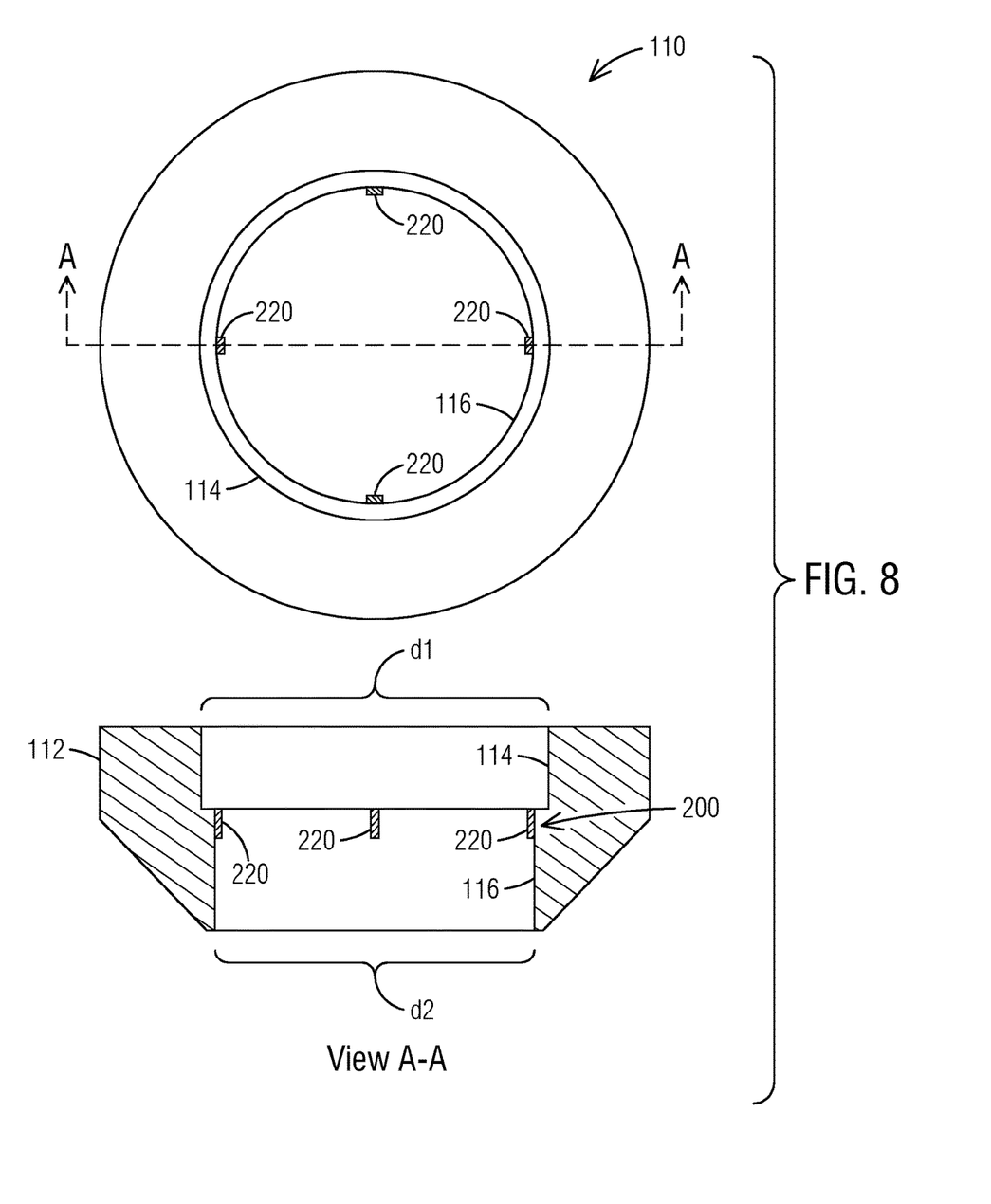
Figure 9:
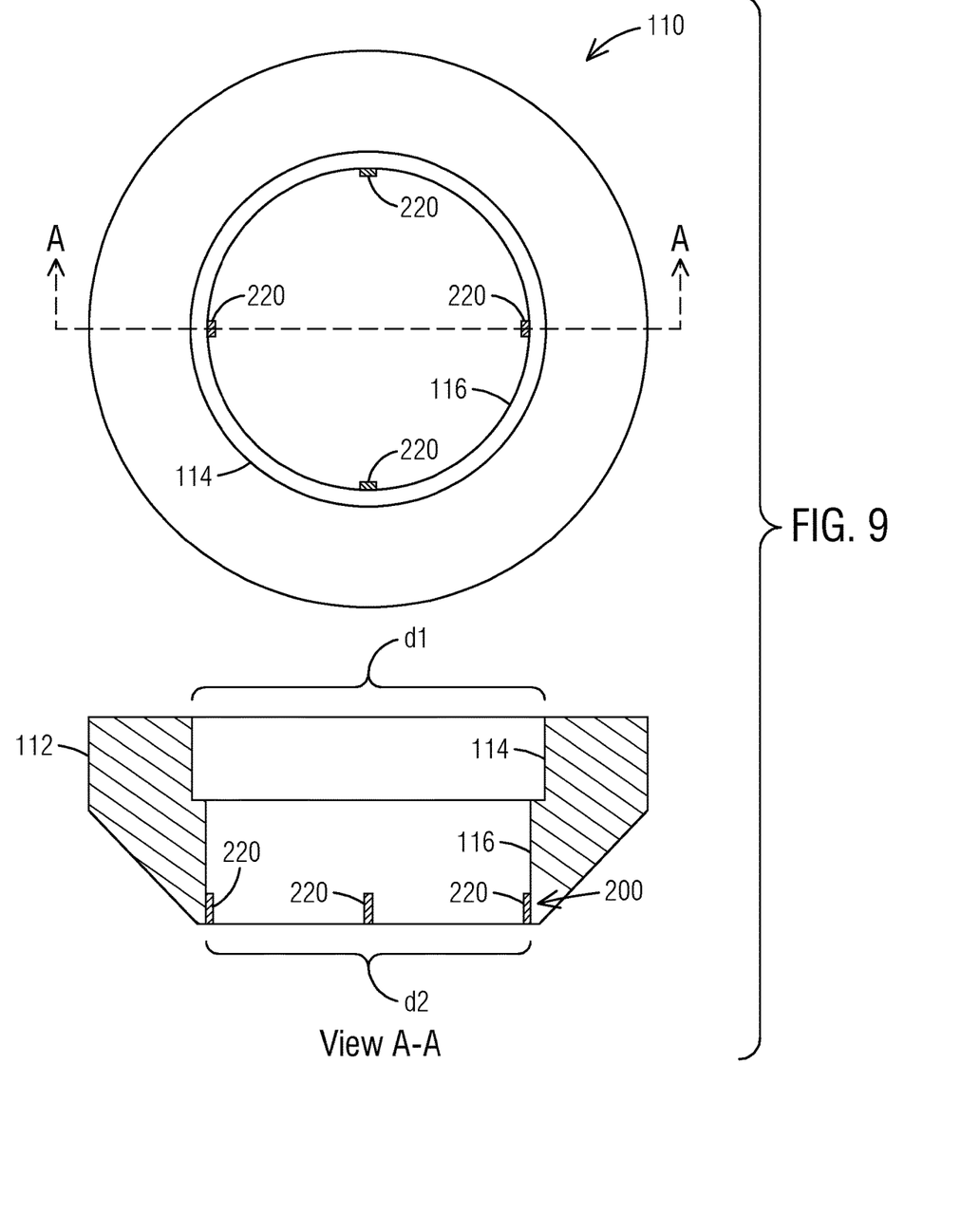

FIG. 7, FIG. 8 and FIG. 9 illustrate top views and cross-sectional views of a seal member 110 of the seal assembly 100 in accordance with a third, fourth and fifth exemplary embodiment of the present disclosure.

As described earlier, the seal member 110 comprises a tapered cylindrical body 112 including the first section 114 and the second section 116. The first section 114 comprises a first inner diameter d1 that is greater than a second inner diameter d2 of the second section 116.

In accordance with an exemplary embodiment of the present disclosure, the second section 116 of the seal member 110 comprises the holding device 200. The holding device 200 comprises a plurality of friction fit elements arranged equidistantly on an inner surface of the second section 116. More specifically, the plurality of friction fit elements is configured as friction fit fingers 220 arranged longitudinally from an upper end to a lower end on the inner surface of the second section 116. The examples of FIG. 7, FIG. 8 and FIG. 9 illustrates four (4) friction fit fingers 220. However, it should be noted that the seal member 110 may comprise more or less than 4 friction fit fingers 220, for example six (6) friction fit fingers 220 at the second section 116. Size and dimensions of the friction fit fingers 220 may vary but are such that the seal member 110 and heat shield member 120 properly form the seal assembly 100.

With reference to FIG. 7, the friction fit fingers 220 may be arranged longitudinally from an upper end to a lower end on the inner surface of the second section 116 in a continuous manner. With reference to FIG. 8 and FIG. 9, the friction fit fingers 220 may be arranged only at portions or short section on the inner surface of the second section 116.

Figure 10:
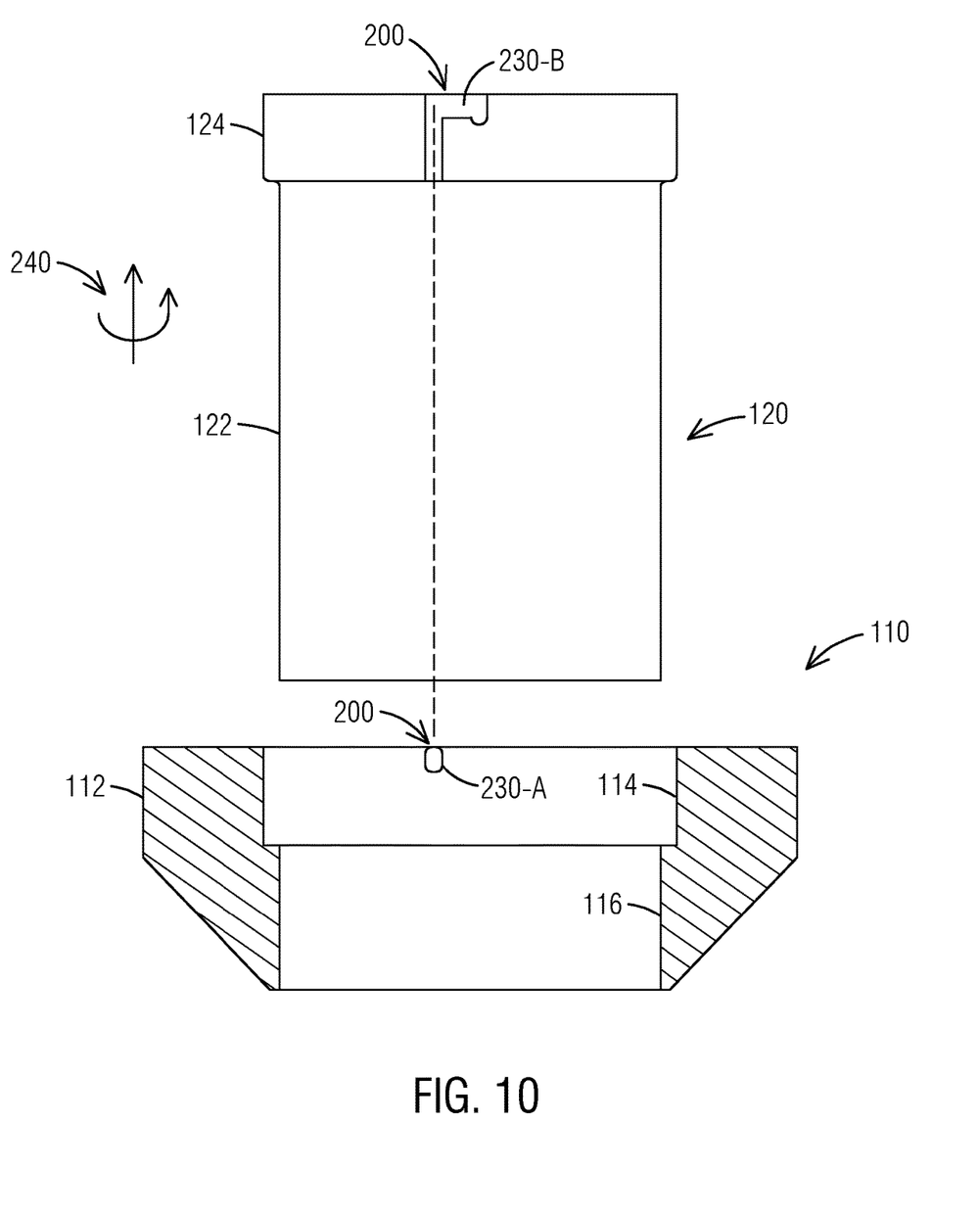
FIG. 10 illustrates cross-sectional views of a seal member and heat shield member in accordance with a sixth exemplary embodiment of the present disclosure.

FIG. 10 illustrates cross-sectional views of a seal member 110 and heat shield member 120 of the seal assembly 100 in accordance with a sixth exemplary embodiment of the present disclosure.

In accordance with an exemplary embodiment of the present disclosure, the seal member 110 in combination with the heat shield member 120 incorporate the holding device 200. More specifically, the first section 114 of the seal member 110 incorporates the holding device 200 in combination with the upper section 124 of the heat shield member 120.

In an example, the holding device 200 is designed as a pin-and-groove coupling or connection, including pin 230-A and groove 230-B. The pin 230-A is arranged or incorporated or machined into the first section 114 of the seal member 110. The associated groove 230-B is incorporated or machined into the upper section 124 of the heat shield member 120.

As indicated by the sequence and directions of movements, see reference numeral 240, in a first step, the seal member 110 is moved or pushed in a vertical direction over the cylindrical body 122 of the heat shield member 120, wherein the pin 230-A is positioned such that it moves into the groove 230-B. In a second step, the seal member 110 is rotated in a horizontal direction until the pin 230-A locks the seal member 110 in place.

Figure 11:
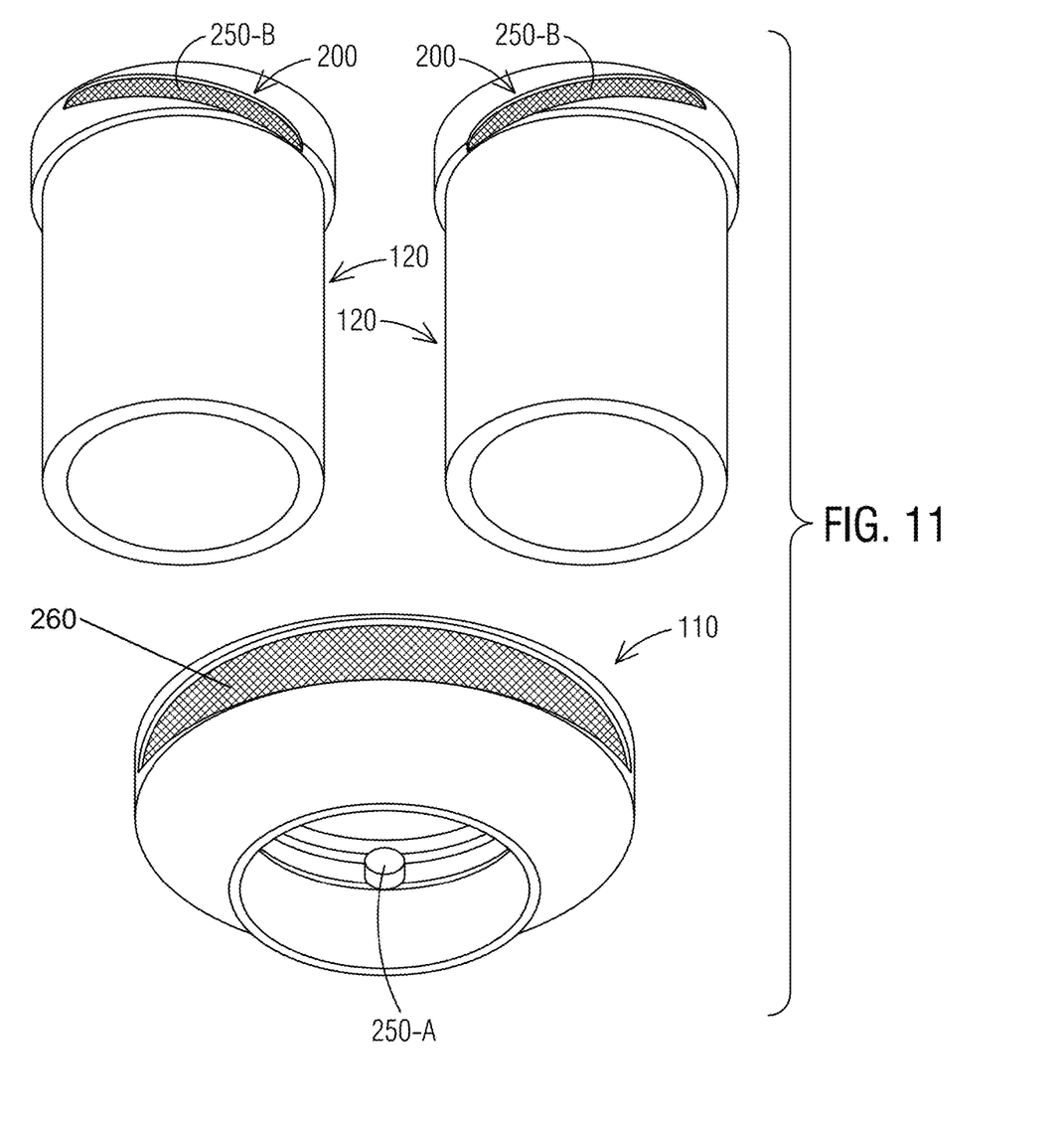
FIG. 11 and FIG. 12 illustrates cross-sectional views of a seal member and heat shield member in accordance with a seventh exemplary embodiment of the present disclosure.
Figure 12:
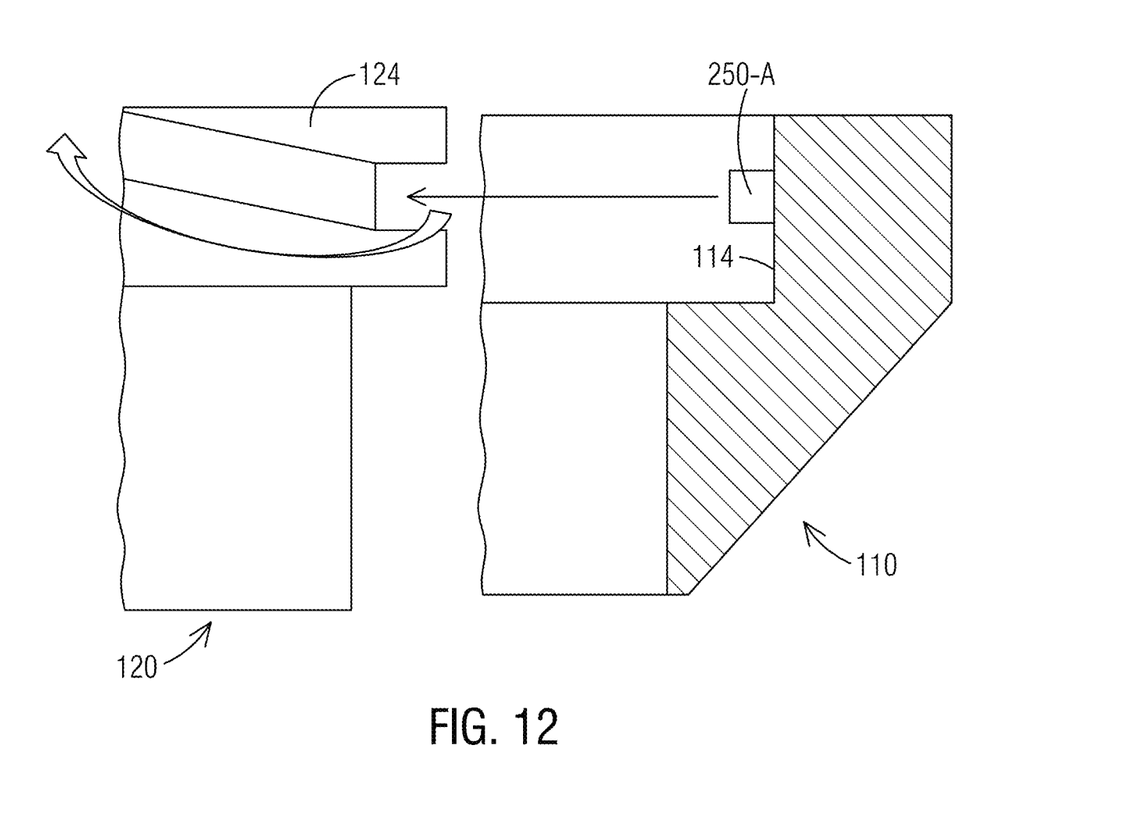

FIG. 11 and FIG. 12 illustrate perspective and cross-sectional views of a seal member 110 and heat shield member 120 of the seal assembly 100 in accordance with a seventh exemplary embodiment of the present disclosure.

In accordance with an exemplary embodiment of the present disclosure, the seal member 110 in combination with the heat shield member 120 incorporate the holding device 200. More specifically, the first section 114 of the seal member 110 incorporates the holding device 200 in combination with the upper section 124 of the heat shield member 120.

The embodiment illustrated in FIG. 11 and FIG. 12 is another type of a pin-and-groove connection, herein also referred to as a "quarter-turn" connection, which is similar to a screw coupling. The holding device 200 includes pin 250-A and groove or thread 250-B. The pin 250-A is arranged or incorporated or machined into the first section 114 of the seal member 110. The associated groove or thread 250-B is incorporated or machined into the upper section 124 of the heat shield member 120. FIG. 11 illustrates two versions of the heat shield member 120 with differently designed groove or thread 250-B, that results in different directions of movement (clockwise or counter-clockwise rotation) when coupling with the seal member 110.

For assembling the seal member 110 and the heat shield member 120, the seal member 110 is moved or pushed in a vertical direction over the cylindrical body 122 of the heat shield member 120, wherein the pin 250-A is positioned such that it moves into the groove 250-B. In a second step, when the pin 250-A is aligned with a first end of the groove or thread 250-B, the seal member 110 is rotated in a horizontal direction (clockwise or counter-clockwise) for about a quarter turn along the groove or thread 250-B until the seal member 110 is in place and tight. With reference to FIG. 11, an outer surface of the upper portion (essentially corresponding to the first section 114), may comprise a surface treatment. The outer surface may comprise a surface pattern 260, such as for example a cross hatching. The surface pattern 260 may provide benefits while holding and assembling the seal assembly 100, and within an injector mounting bore.

The described seal assembly 100 provides a combustion seal with a seal member 110 and a heat shield member 120, incorporating a holding device 200 for retaining the seal member 110 in place with the heat shield member 120, without a need for additional separate components or elements to hold the seal assembly 100 together. The holding device 200 is manufactured or machined into the seal member 110 and/or the heat shield member 120.

While embodiments of the present disclosure have been disclosed in exemplary forms, it will be apparent to those skilled in the art that many modifications, additions, and deletions can be made therein without departing from the spirit and scope of the disclosure and its equivalents, as set forth in the following claims.

The invention claimed is:

1. A combustion seal assembly comprising:
   a seal member comprising a first section and a second section, and
   a heat shield member,
   wherein the seal member and the heat shield member are configured to form a combustion seal,
   wherein the first section of the seal member incorporates a holding device in combination with the heat shield member to retain the seal member in place with the heat shield member,
   wherein the holding device is configured as a pin-and-groove coupling, the seal member comprising the pin and the heat shield member comprising the groove, and
   wherein an outer surface of the seal member comprises a surface pattern.

2. The combustion seal assembly of claim 1,
   wherein the seal member comprises a tapered cylindrical body, and
   wherein the first section comprises a first inner diameter that is greater than a second inner diameter of the second section.

3. The combustion seal assembly of claim 1,
   wherein the heat shield member comprises a body, and
   wherein the body comprises a cylindrical upper section and a cylindrical lower section, the cylindrical upper section comprising an outer diameter that is greater than the outer diameter of the cylindrical lower section.

4. The combustion seal assembly of claim 1,
   wherein the holding device is manufactured or machined into the seal member and/or the heat shield member.

5. A fuel injector for an internal combustion engine,
   the fuel injector comprising a combustion seal assembly as claimed in claim 1.

* * * * *